United States Patent
Fickes et al.

(10) Patent No.: US 6,526,274 B1
(45) Date of Patent: Feb. 25, 2003

(54) METHOD, SYSTEM, AND COMPUTER PROGRAM PRODUCT FOR EXTENDING THE FUNCTIONALITY OF A PERSONAL INFORMATION MANAGER TO TELEPHONE SYSTEM INTERACTIONS

(75) Inventors: Herb E. Fickes, Stanardsville, VA (US); Michael W. Brown, Charlottesville, VA (US); Jay A. Neale, Afton, VA (US); John M. Baird, Charlottesville, VA (US); Michael R. Berrang, Waynesboro, VA (US)

(73) Assignee: Comdial Corporation, Charlottesville, VA (US)

( * ) Notice: Subject to any disclaimer, the term of this patent is extended or adjusted under 35 U.S.C. 154(b) by 0 days.

(21) Appl. No.: 09/426,639

(22) Filed: Oct. 25, 1999

(51) Int. Cl.$^7$ ................................................. H04M 3/42
(52) U.S. Cl. ..................... 455/414; 455/445; 455/412; 455/413; 455/417; 379/200.01; 379/200.05
(58) Field of Search ................................. 455/445, 458, 455/414, 412, 413, 417; 379/201.01, 201.05

(56) References Cited

U.S. PATENT DOCUMENTS

| | | | | |
|---|---|---|---|---|
| 5,933,778 A | * | 8/1999 | Buhrmann et al. | 455/461 |
| 6,125,281 A | * | 9/2000 | Wells et al. | 455/466 |
| 6,157,706 A | * | 12/2000 | Rachelson | 379/100.08 |
| 6,208,879 B1 | * | 3/2001 | Iwata et al. | 455/466 |
| 6,310,947 B1 | * | 10/2001 | Polcyn | 379/211.01 |

OTHER PUBLICATIONS

Blackberry Wireless Email Solution (visited Jun. 14, 2000)<http://www.blackberry.net/home/main.shtml>, <www.blackberry.net/overview/main.shtml>.
Nortel Networks (visited Jun. 14, 2000) <http://nortelnetworks.com/>, <http://www.nortelnetworks.com/products/>.
OL97: Use of OLE Automation with Microsoft Outlook 97 (last reviewed Mar. 23, 2000) <http://support.microsoft.com/support/kb/articles/Q170/2/62.ASP>.
Spanlink Communications (visited Jun. 14, 2000)<http://www. spanlink.com>, <http://www.spanlink.com/Products/FastCall/HEADER.html>.
Fastcall Agent: Application Brief, May 1999.
Tygart (visited Jun. 14, 2000) <http://206.152.242.198/>, <http://206.152.242.198/Tygartnsf/Products?OpenPage>, <http://206.152.242.198/Tygart.nsf/QuickTour?OpenPage>, <http://206.152.242.198/Tygart.nsf/ProFeatures?OpenPage>.

* cited by examiner

Primary Examiner—William Trost
Assistant Examiner—Danh C Le
(74) Attorney, Agent, or Firm—Sterne Kessler Goldstein & Fox PLLC

(57) ABSTRACT

A method, system, and computer program product are provided that extend the functionality of personal information managers (PIMs) to allow a user to perform telephone control operations through the PIM. The method, system, and computer program product also allow the user to extend the capabilities of his telephone system. The user can receive information maintained by the PIM (such as contacts, unread e-mail messages, and calendar appointments) as needed, without requiring a query. The user can receive unread e-mail or reminders about imminent appointments through a pager, for example. Parties trying to contact the user can also receive information maintained by the user's PIM. For example, a caller can learn the user's whereabouts, as indicated by the user's appointment calendar, when the user is unavailable to answer a telephone call. This functionality is provided in part by connecting the PIM and its data structures to a private branch exchange. This facilitates the distribution of information maintained by the PIM and allows control of telephone operations through the PIM user interface.

4 Claims, 15 Drawing Sheets

METHOD, SYSTEM, AND COMPUTER PROGRAM PRODUCT FOR EXTENDING THE FUNCTIONALITY OF A PERSONAL INFORMATION MANAGER TO TELEPHONE SYSTEM INTERACTIONS

BACKGROUND OF THE INVENTION

1. Field of the Invention

The invention described herein relates to computer systems, and more particularly to personal information management.

2. Related Art

The use of personal information management software packages, such as Microsoft's OUTLOOK and Novell's GROUPWISE, is widespread in the workplace. These so-called personal information managers, or PIMs, typically run on personal computers and include electronic mail capability, an appointment calendar, and a contact list of frequent contacts. PIMs can greatly facilitate the organization of a worker's interactions with other parties. PIMs allow the sending, receiving, and sorting of e-mail messages, the planning of appointments, and the maintenance and organization of telephone numbers and e-mail addresses. For many workers, however, the telephone remains the primary appliance for interaction with others. While the modern office telephone has numerous automated features that enhance its capabilities, such as voice mail and conferencing, it remains essentially a separate device from the personal computer. Any functional connection between the devices is limited. OUTLOOK, for example, allows a worker to enter a telephone number through its graphical user interface (GUI) in order to dial and place a telephone call. Nonetheless, the level of interaction between the telephone and the personal computer is limited. Moreover, telephone or wireless access by a worker to information maintained by a PIM, such as calendar information and e-mail queues, can be cumbersome.

Hence there is a need for a closer coupling between a worker's telephone system and computer system that would enhance the functionality of both. Such a coupling would allow telephone system access to information maintained by a PIM, and would allow control of telephone operations through the PIM.

SUMMARY OF THE INVENTION

The invention is a method, system, and computer program product that extends the functionality of PIMs to allow a user to perform telephone control operations through the PIM. The invention also allows the user to extend the capabilities of the telephone system of the user. With the invention, the user can receive information maintained by the PIM (such as contacts, unread e-mail messages, and calendar appointments) as needed, without requiring a query. The provision of this information without requiring a query is known hereinafter as the automatic provision of such information. The user can receive unread e-mail or reminders about imminent appointments through a pager, for example. Parties trying to contact the user can also receive information maintained by the user's PIM. For example, a caller can learn the user's whereabouts, as indicated by the user's appointment calendar, when the user is unavailable to answer a telephone call. The invention provides this functionality in part by connecting the PIM and its data structures to a private branch exchange. This facilitates the distribution of information maintained by the PIM and allows control of telephone operations through the PIM user interface.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

The purpose of the invention described herein is to extend the functionality of personal information managers (PIMs).

PIMs are now common in the workplace. They typically take the form of application programs running on a personal computer and are often adapted to a network environment. Examples include Microsoft's OUTLOOK and Novell's GROUPWISE software suites. PIMs provide e-mail capability, list contacts by name, e-mail address, or telephone number, and maintain appointment calendars. The invention extends the functionality of a PIM so that it can be used to control a user's telephone system more fully. The invention also provides access to data structures maintained by the PIM, such as unread e-mail queues and calendar information. The invention provides such data to users as needed automatically.

II. System

Figure 1:
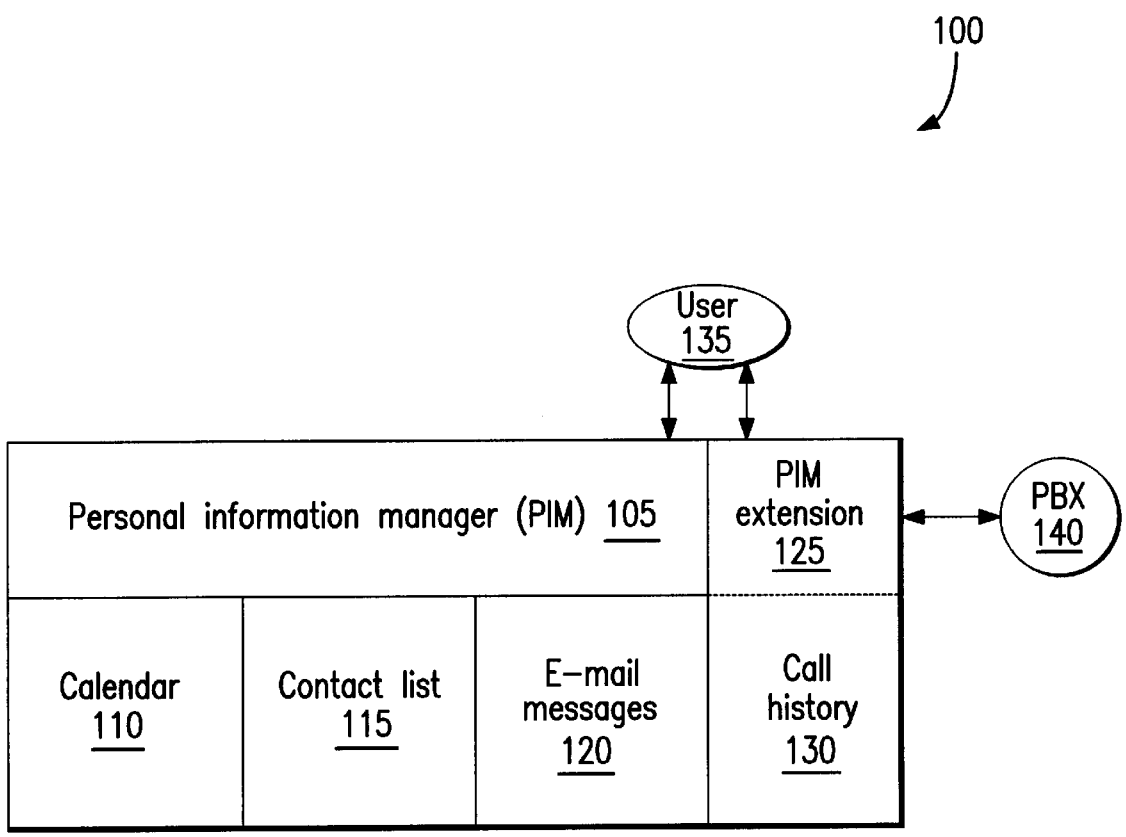
FIG. 1 is an illustration of the logical relationship between the invention and a PIM, according to an embodiment of the invention.

A logical view of the invention is illustrated in FIG. 1 as logical system 100. The invention operates in the context of a personal information manager 105. The PIM 105 is typically embodied in software, firmware, or the like. PIM 105 maintains an appointment calendar 110 with entries defined by a user 135. PIM 105 also maintains a contact list 115. The contact list typically includes names, email addresses, and telephone numbers of parties whom user 135 may need to contact. Contact list 115 is sometimes known as an address book. PIM 105 also provides e-mail functionality, and maintains a queue of unread e-mail messages, as well as a list of received e-mail messages that have been read and saved. Received e-mail messages are shown collectively as e-mail messages 120.

The invention is embodied as a PIM extension 125. In a preferred embodiment of the invention, extension 125 is embodied in software, although it could also be embodied in firmware, hardware, or a combination thereof. Extension 125 accesses calendar 110, contact list 115, and e-mail messages 120 through PIM 105. Extension 125 can then provide the information contained therein to user 135 automatically, without requiring a query. Extension 125 also provides information that is maintained by PIM 105 to parties who may be calling user 135. To allow extension 125 to communicate with callers (and with user 135, if user 135 is away from system 100), extension 125 is connected to a private branch exchange (PBX) 140. PBX 140 is connected to a telephone network (not shown).

Moreover, extension 125 provides a means by which user 135 can control a telephone. Note that extension 125 also includes a call history data structure 130. As will be described in greater detail below, call history 130 contains a history of calls made by (and received by) user 135. This information includes telephone numbers, and can also include identification information regarding the callers, such as name, organization, and the like.

Interfacing an extension to a PIM is well known in the relevant art. In the case of OUTLOOK, for example, the interface standard has been well publicized by Microsoft. Interfacing to OUTLOOK is also described in several books, such as "Building Applications With Microsoft Outlook 98" (Microsoft Press, 1998) and "Developing Applications for Microsoft Exchange With C++" (Ben Goetter, Microsoft Press, 1996).

Figure 2:
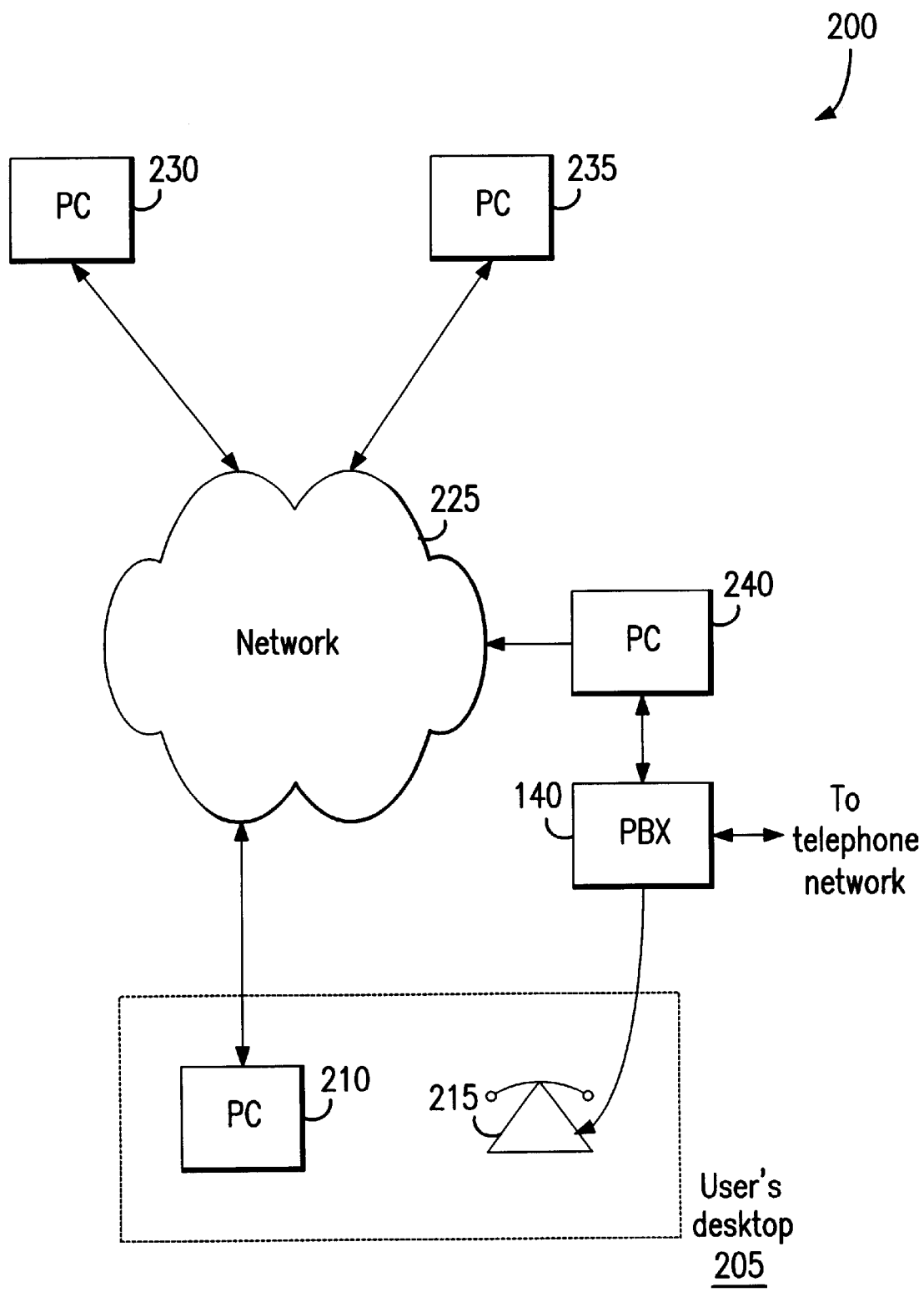
FIG. 2 is an illustration of the communications environment of an embodiment of the invention.

A systemic view of the invention and the context in which it operates is presented in FIG. 2 as system 200. A user's desktop 205 is shown with a personal computer 210 and a telephone unit 215. PIM 105 and the extension 125 execute on computer 210. As is common in workplace environments, telephone unit 215 is connected to a private branch exchange, PBX 140. Computer 210 is connected to a computer network 225. Network 225 connects computer 210 with a plurality of other computers, illustrated as personal computers 230 and 235. Information maintained by PIM 105 (such as calendar 110, contact list 115, e-mail messages 120, and call history 130) can be stored locally on computer 210, or stored at another machine, such as another computer or server connected to network 225.

Note that in an alternative configuration (not shown), computer 210 is not directly connected to network 225. Instead, both computer 210 and telephone 215 are connected to a common interface module, which serves to connect both devices to PBX 140. In this arrangement, therefore, computer 210 connects to network 225 via PBX 140. Such an arrangement is well known to those skilled in the relevant art.

Also connected to network 225 is a personal computer 240. Computer 240 interfaces network 225 with PBX 140. Therefore, while PBX 140 is connected to a larger telephone network, it is also connected to network 225. PBX 140 is therefore also connected to machines tied to computer network 225. Since PIM 105 is executing on computer 210, information maintained by PIM 105 is accessible by PBX 140. This information can be made available, through PBX 140, to parties attempting to call user 135 as well as to user 135. As will be described in greater detail below, this information is provided automatically, in a user-friendly manner, without requiring a party to perform a manual query on the information maintained PIM 105.

Figure 3:
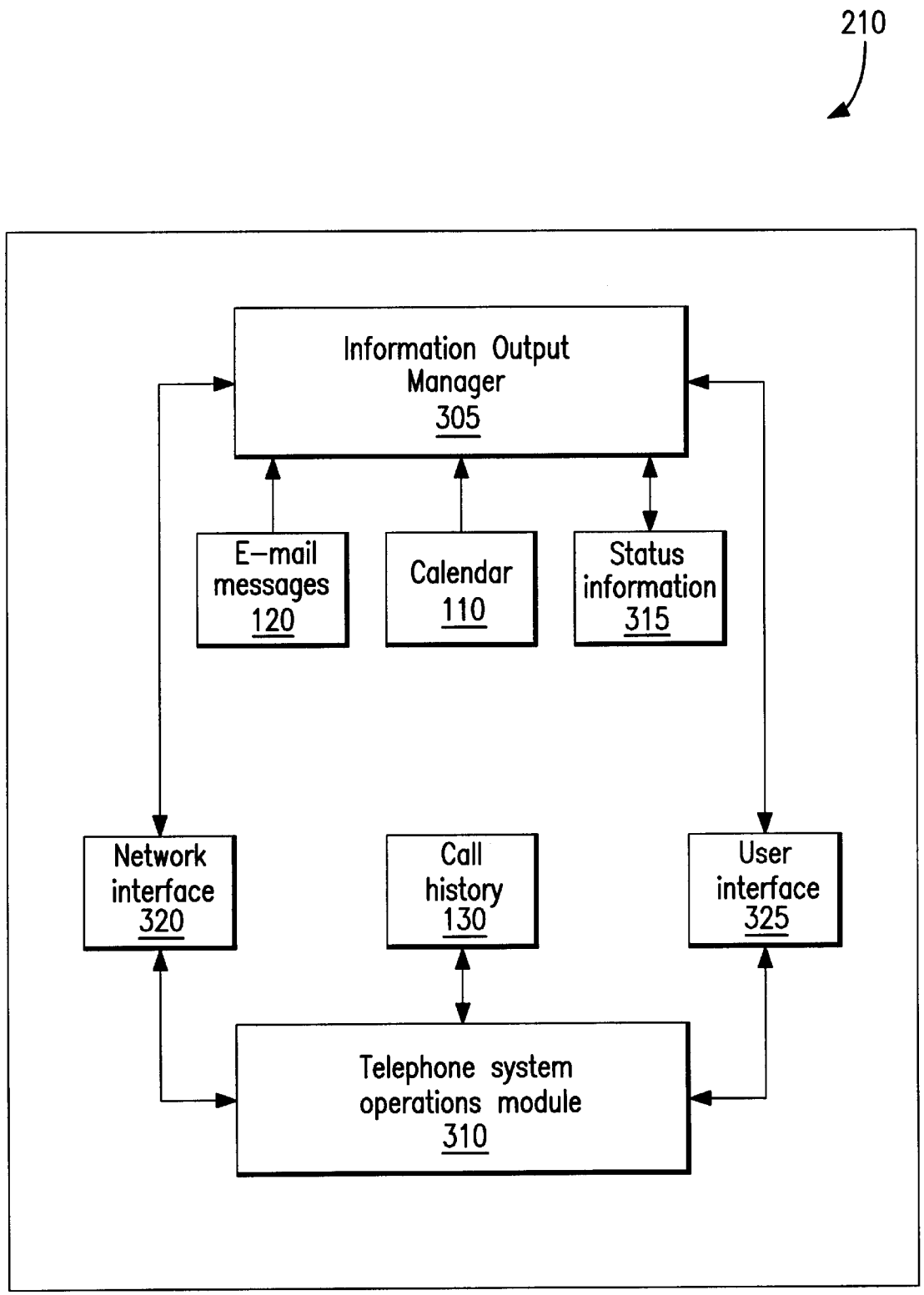
FIG. 3 illustrates components of an embodiment of the invention.

Components of the invention operating in computer 210 are illustrated in FIG. 3 according to one embodiment. PIM extension 125 includes two components, an information output manager 305 and a telephone system operations module 310. Information output manager 305 is responsible for providing information to user 135 and to parties seeking to call user 135. Information output manager 305 therefore has access to e-mail messages 120 and calendar 110. As will be described in greater detail in section III, information output manager 305 provides the information contained in these data structures to user 135 and to callers of user 135. Information destined for user 135 can be displayed to user 135 via user interface 325, if user 135 is located with computer 210. If user 135 is located elsewhere, this information is sent to user 135 via a network interface 320. Information destined for a caller of user 135 is also sent to the caller via network interface 320. Information output manager 305 also accesses status information 315 regarding the status of telephone operations. Information output manager 305 presents status information 315 to user 135 via user interface 325.

Telephone system operations module 310 creates and maintains call history 130. Call history 130 lists numbers of parties who have called (and who have been called by) user 135, information obtained by telephone system operations module 310 from PBX 140 via network interface 320. Telephone system operations module 310 presents the information contained in call history 130 to user 135 via user interface 325. Telephone system operations module 310 also receives commands for telephone system operation from user 135 via user interface 325. Telephone system operations module 310 then controls the telephone system through commands issued to PBX 140, via network interface 320.

Figure 4:
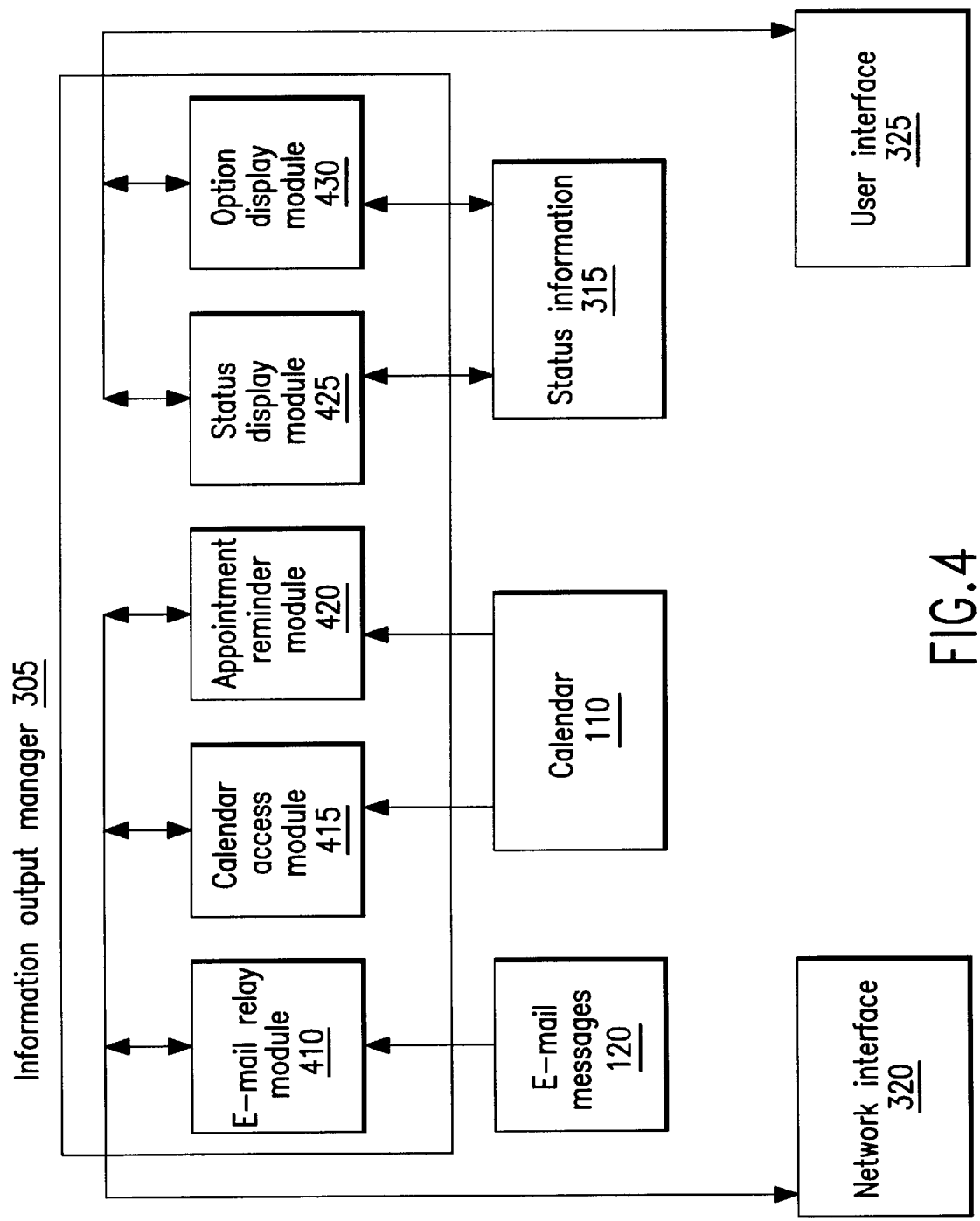
FIG. 4 illustrates an information output manager according to an embodiment of the invention.

An embodiment of information output manager 305 is illustrated in greater detail in FIG. 4. Information output manager 305 includes an e-mail relay module 410. As will be described in greater detail in section III below, e-mail relay module 410 accesses e-mail messages 120 and sends unread messages to a pager (or other digital wireless communications device) of user 135. These messages are sent via network interface 320 to PBX 140 for transmission to user 135.

Information output manager 305 also includes a calendar access module 415. Calendar access module 415 reads calendar 10 and conveys information contained therein to user 135 trying to call another party. This tells user 135 the whereabouts of the other party. Information read from calendar 10 is sent to the user 135 via network interface 320. Information output manager 305 also includes an appointment reminder module 420. Appointment reminder module 420 reads calendar 110 and sends information regarding upcoming appointments to a digital wireless communications device of user 135. Information read from calendar 110 is sent to user 135 via network interface 320.

Information output manager 305 also includes a status display module 425. Status display module 425 reads status information 315 regarding the status of telephone operations and displays the information to user 135 via user interface 325.

Information output manager 305 also includes an option display module 430. Option display module 430 presents options to user 135 for the control of the telephone system. The displayed options are derived from status information 315, and are presented to user 135 via user interface 325.

Figure 5:
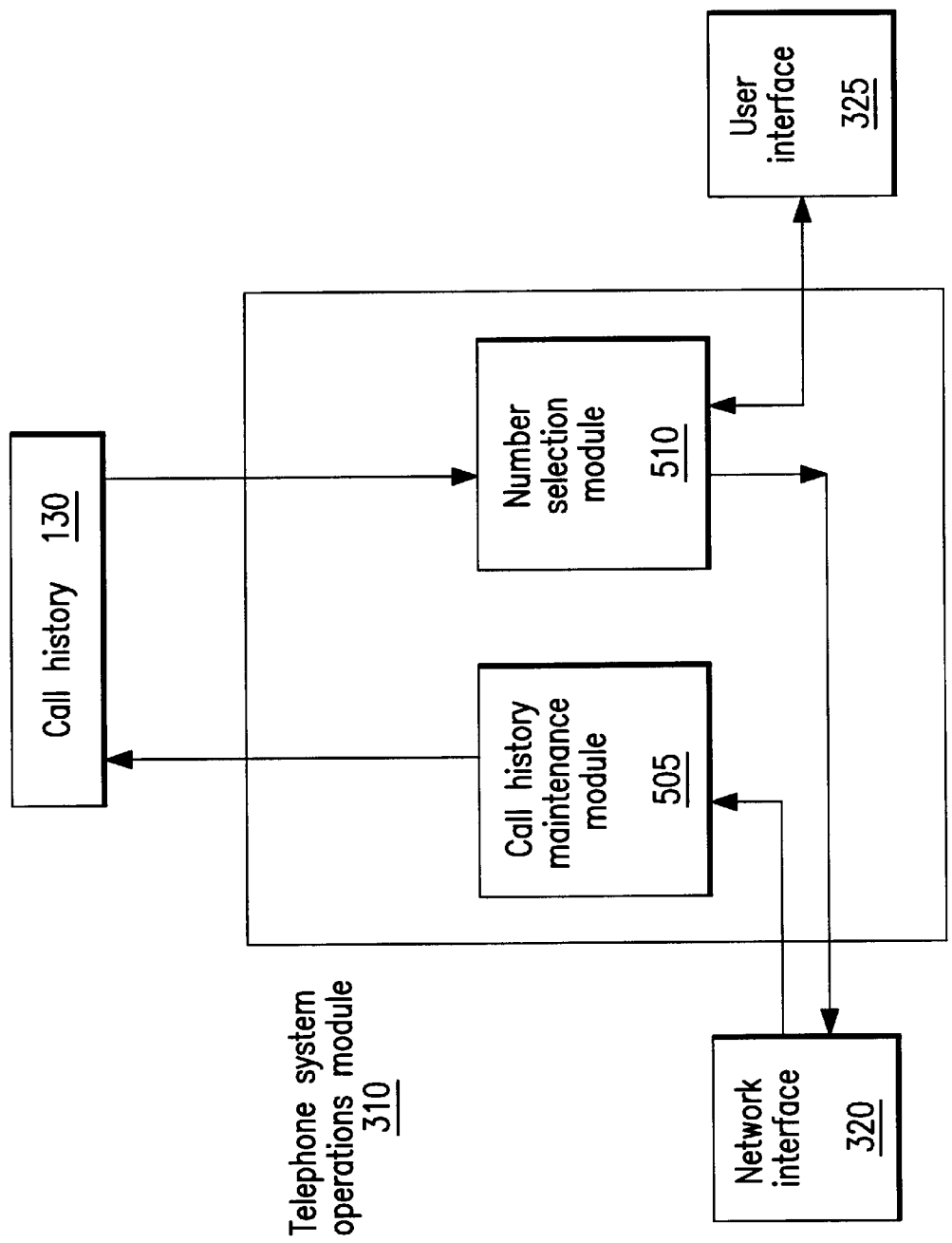
FIG. 5 illustrates a telephone system operations module according to an embodiment of the invention.

Telephone system operations module 310 is illustrated in greater detail in FIG. 5. Telephone system operations module 310 includes a call history maintenance module 505 and a number selection module 510. Call history maintenance module 505 creates and updates call history 130, based on data received from PBX 140. This data is received from PBX 140 via network interface 320.

Number selection module 510 reads call history 130 and displays its contents to user 135 via user interface 325. This permits user 135 to select a number from call history 130 for dialing. Number selection module 510 then sends the selected number to PBX 140 via network interface 320. PBX 140 can then place the call.

III. Method

The invention permits information maintained by PIM 105 and extension 125, such as calendar information and unread e-mail messages, to be presented to user 135. The information is provided automatically, without requiring user 135 to perform a query. The information can also be provided to a party calling the user. The invention also permits user 135 to perform telephone operations through PIM 105 and extension 125. Specific components of the invention and their operation are described here.

A. Forwarding E-mail

Figure 6:
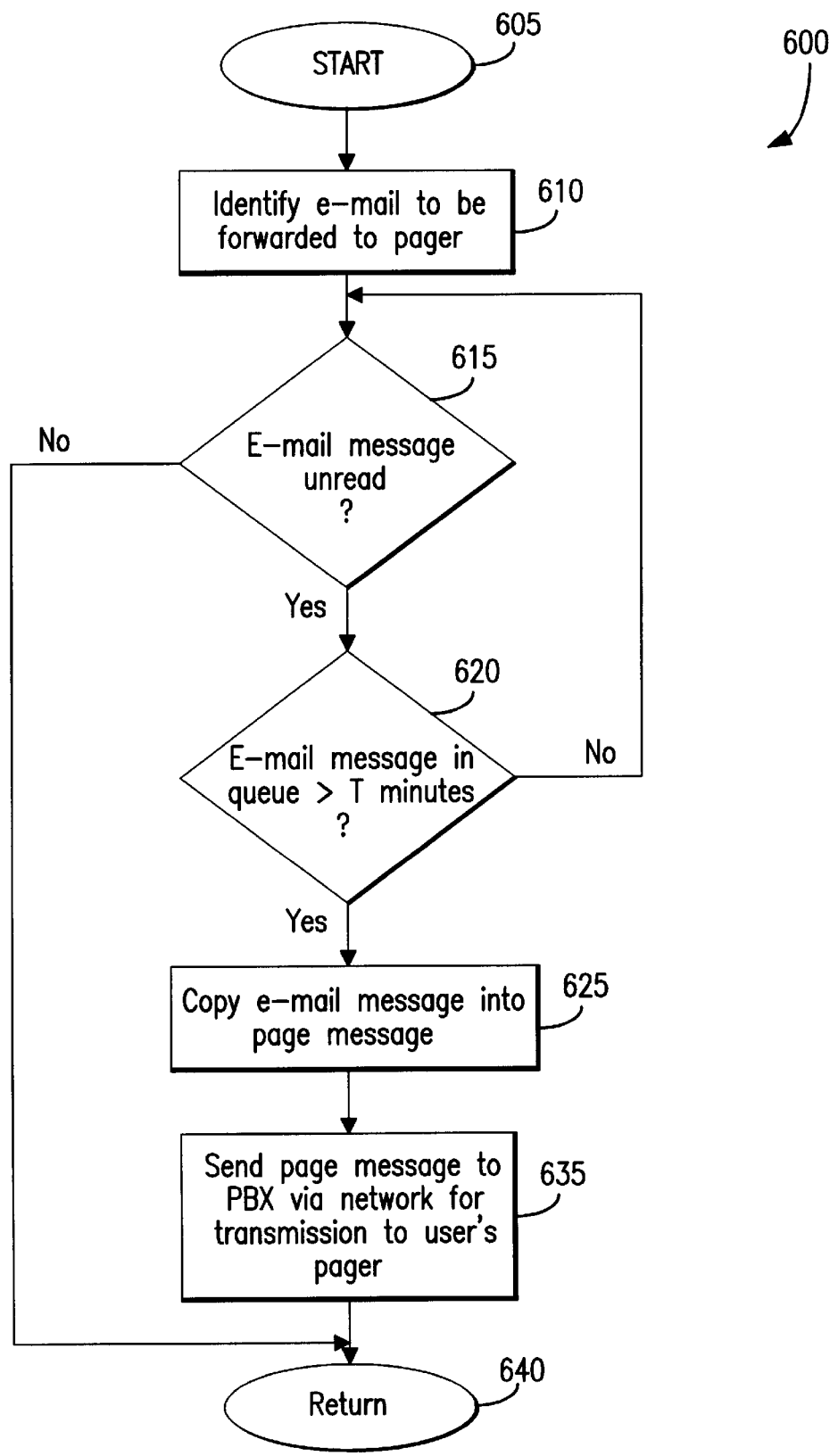
FIG. 6 is a flowchart illustrating the process of conveying a user's unread e-mail to the user's wireless communications device, according to an embodiment of the invention.

FIG. 6 illustrates a process 600 whereby unread e-mail messages can be forwarded to the user's wireless communications. Such a wireless communications device can, for example, be a pager or other digital wireless communications device with an appropriate display. For convenience, any such device is known hereinafter as a pager. Likewise, any message transmitted to such a device is known hereinafter as a page. The process starts with a step 605. In a step 610, the set of e-mail messages to be forwarded to the wireless communications device is specified. In an embodiment of the invention, step 610 is performed by the user in the course of initial configuration of PIM 105. The user may, for example, designate that all future incoming e-mail to be forwarded in the event that the user has no computer access. Alternatively, the user may identify only those e-mail messages of a certain priority to be forwarded. In other embodiments, the e-mail messages may be filtered more discretely, so that only e-mail messages from a certain party or parties will be forwarded, for example. In a step 615, a determination is made by PIM 105 as to whether an e-mail message received by user 135 is unread. If so, then in a step 620, a determination is made by e-mail relay module 410 as to whether the e-mail message has been in e-mail messages 120, unread, for longer than a predetermined period. If not, then the process returns to step 615. Here, the message will be checked once again to see whether the message remains unread. If, in step 620, it is determined that the e-mail message has been in the e-mail messages 120 unread for more than the predetermined period of T minutes, then the process continues at a step 625. In an embodiment of the invention, T is set to ten minutes.

In step 625, the e-mail message is copied into a page message by e-mail relay module 410. In a step 635, the pager message is sent by e-mail relay module 410 to PBX 140 for transmission to the pager of user 135. If, in step 615, it is determined that the e-mail message has been read, then there is no point in forwarding the message to user 135. The process concludes in a step 640. Process 600, therefore, allows e-mail messages predesignated by user 135, e.g., high-priority messages, to be relayed to user 135 when user 135 is not present at computer 210 to read the messages. The e-mail messages are automatically forwarded to user 135.

B. Calendar Information for Callers

Figure 7:
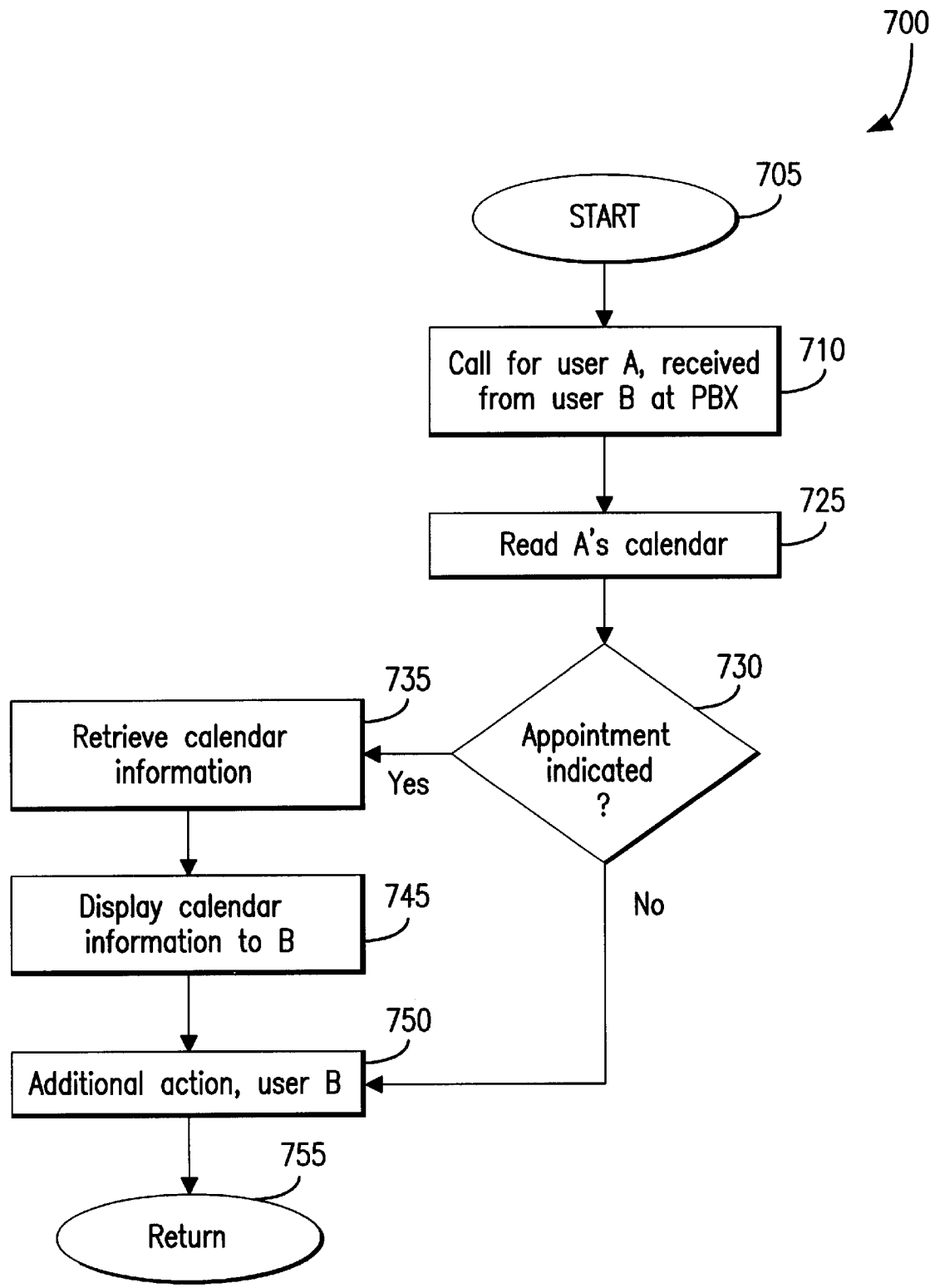
FIG. 7 is a flowchart illustrating the process of sending a user's calendar information to a caller, according to an embodiment of the invention.

Process 700 of FIG. 7 illustrates a process whereby user 135 is given information on the whereabouts of a called party, given that the called party is unable to answer the telephone. The process relays information from the calendar 110 of the called party to the calling party. If, for example, the called party is at a meeting, and this fact was previously stored in calendar 110 of the called party, then the calling party can be given this information. This tells the calling party why the called party is unavailable, instead of merely redirecting the calling party to, say, the voice mail of the called party. The process begins with a step 705. In a step 725, the calendar 110 of user A is read by calendar access module 415 for any appointments that coincide with the time of the call. In a step 730, calendar access module 415 determines whether there is an appointment indicated in calendar 110. If there is no appointment indicated, then in a step 750, user B is now free to take whatever action is appropriate. User B may, for example, simply hang up. Alternatively, user B will be given the option of leaving a message on the voice mail of user A.

If, however, an appointment is indicated in step 730, then the process continues at a step 735. In step 735, information regarding the appointment is retrieved by calendar access module 415, via network interface 325, in the form of a return message. In a step 745, the calendar information contained in the return message is displayed to user B. In this manner, user B is informed that user A is not only unavailable to take the call, but is in an appointment. Note that in an embodiment of the invention, the content of the return message corresponds to the content of the appointment information. User B therefore would be told that user A is, for example, in a budget meeting in conference room 1. In another embodiment of the invention, user B is simply told that user A is in an appointment. In another embodiment, user A can configure calendar access module 415 so that callers such as user B are given as much or as little information as user A decides. In a step 750, user B is now free to take whatever action is appropriate. User B may, for example, simply hang up. Alternatively, user B will be given the option of leaving a message on the voice mail of user A. The process concludes with a step 755.

C. Appointment Reminders

Figure 8:
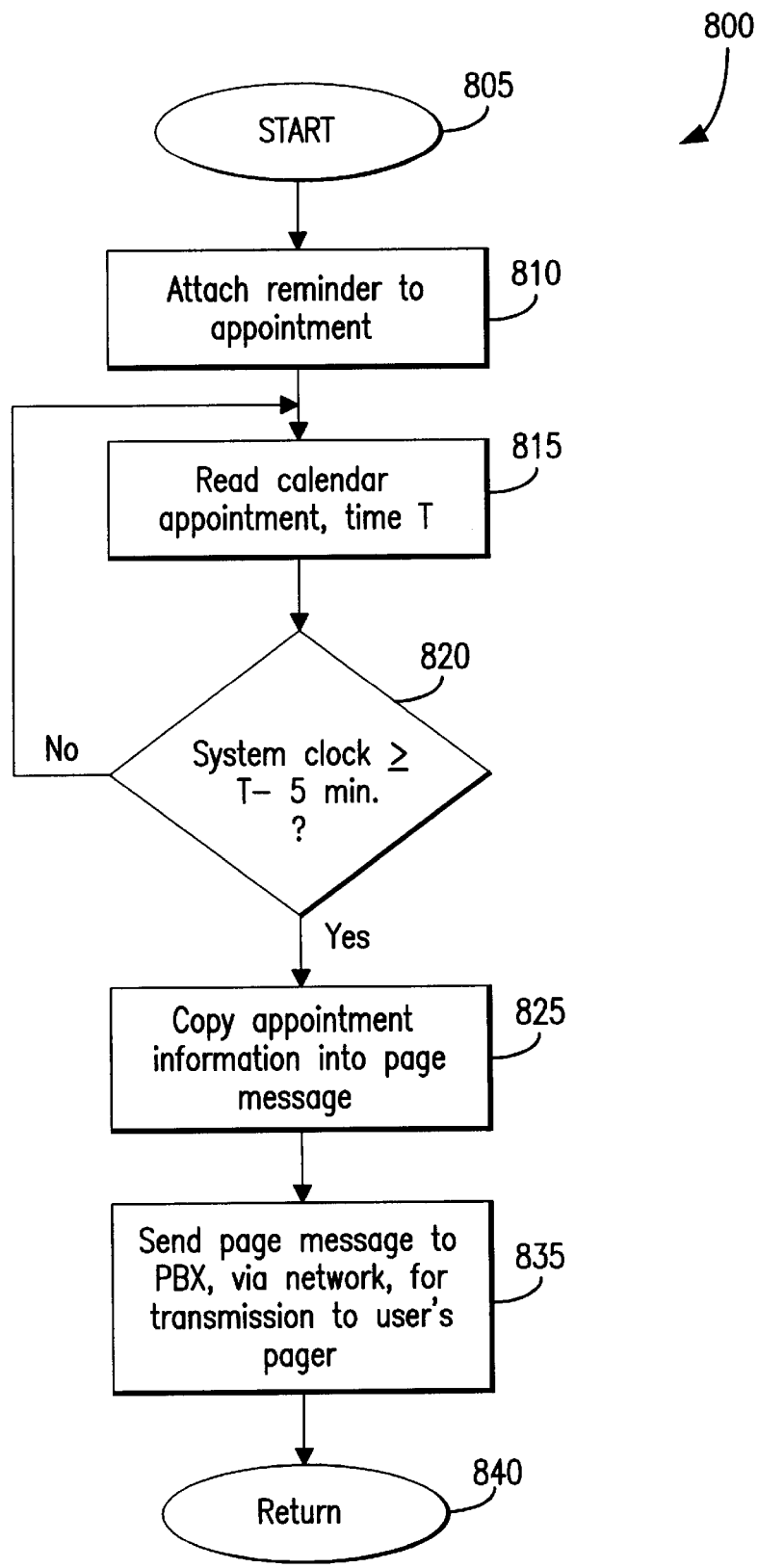
FIG. 8 is a flowchart illustrating the process of reminding a user of an upcoming appointment, according to an embodiment of the invention.

FIG. 8 illustrates a process 800 in which entries in an appointment calendar maintained by PIM 105 are relayed to user 135 through a pager, according to an embodiment of the invention. This serves as a reminder to the user of an imminent appointment. Again, this information is provided to the user automatically. The process begins with a step 805. In a step 810, the user attaches a logical flag to those calendar appointments for which reminders are desired. The programming necessary to support the entry and management of such a flag would be apparent to a person skilled in the relevant art. In a step 815, information relating to the calendar appointment is read from the appointment calendar by appointment reminder module 420. This information could include, for example, the subject, time, and place of an appointment. In a step 820, appointment reminder module 420 determines whether the appointment is sufficiently close. In the embodiment illustrated, the system clock is read and compared with the time of the appointment, so that the process continues only if the appointment is five minutes away or closer. If not, then the clock is polled until the appointment is five minutes away. In alternative embodiments of the invention, a different time period can be chosen. If the appointment is sufficiently close, then the process continues at a step 825. In step 825, the information associated with the appointment is copied by appointment reminder module 420 from the appointment calendar into a page message. In a step 835, appointment reminder module 420 sends the page message to PBX 140 via network interface 320, for transmission to the pager of user 135. The process ends with a step 840. With this process, a user who is away from his desk is sent a reminder of an upcoming appointment. Note that this information is passed to user 135 automatically, without requiring a query on the part of user 135.

D. Status Display

Figure 9:
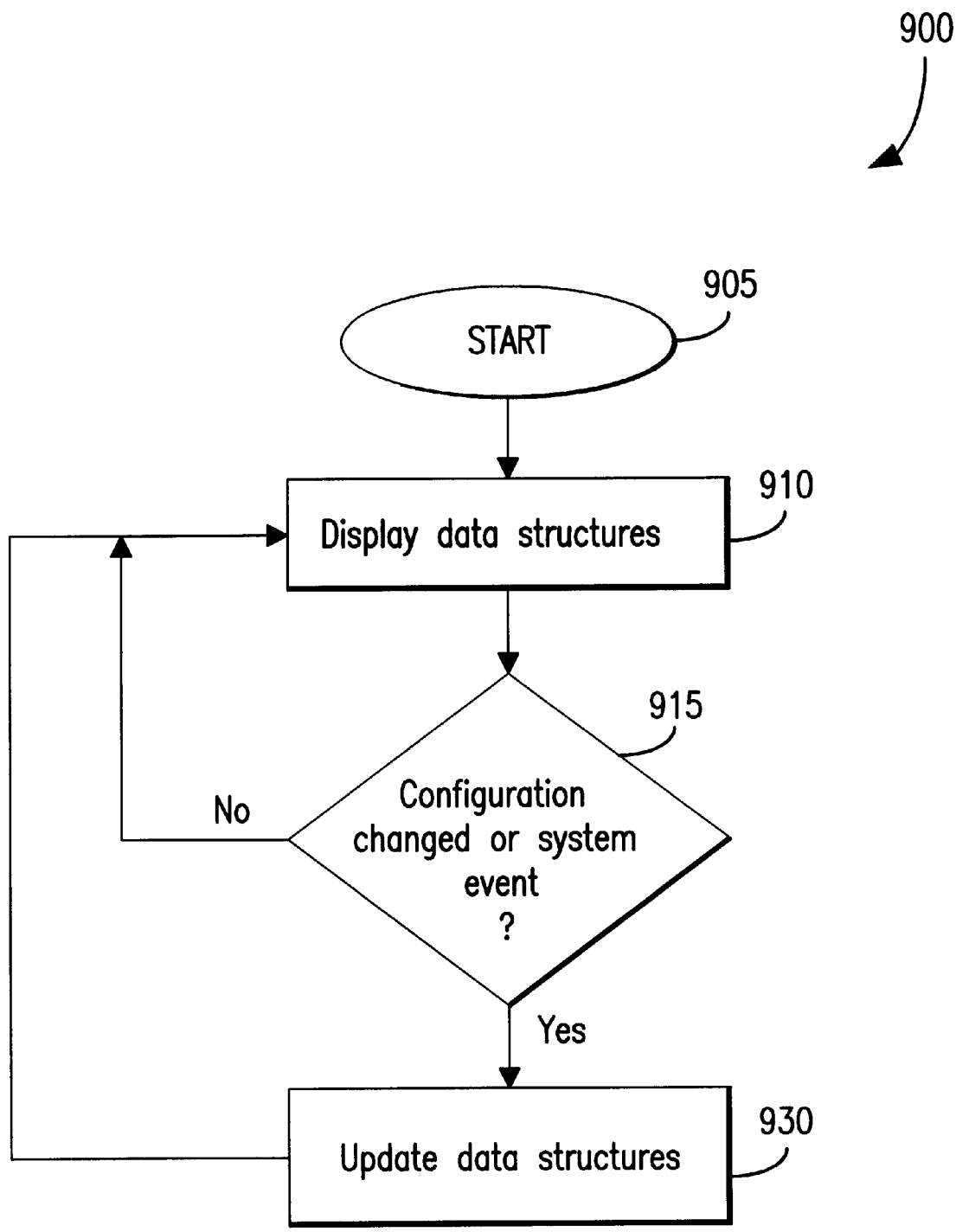
FIG. 9 is a flowchart illustrating the process of developing and displaying status information to a user, according to an embodiment of the invention.

FIG. 9 illustrates a process 900 whereby information regarding the status of the telephone system is displayed to the user. The process begins with a step 905. In an embodiment of the invention, information regarding the current status of telephone operations and configuration options is stored in one or more data structures maintained by PIM extension 125. In a step 910, the contents of the data structures, status information 315, is displayed to user 135 by status display module 425, via user interface 325. The displayed information can include, for example, whether the mute function has been selected, whether headset operation has been selected, or whether a given call has been placed on hold. In a step 915, PBX 140 determines whether the configuration has been changed. The user may, for example, elect to discontinue use of the headset. This would represent a configuration change. In step 915, PBX 140 also determines whether any telephone system events have taken place. Examples of this include an incoming call, or the placement of a current call on hold status. If there are new telephone system events or if there are newly elected configuration changes, then, in a step 930, the associated data structures must be updated. The updated data structures are then displayed by status display module 425 in a step 910. If there are neither new events nor configuration changes, then the current display remains unchanged in step 910. This process serves to provide the user with an updated summary of the current status of the telephone system.

Figure 10:
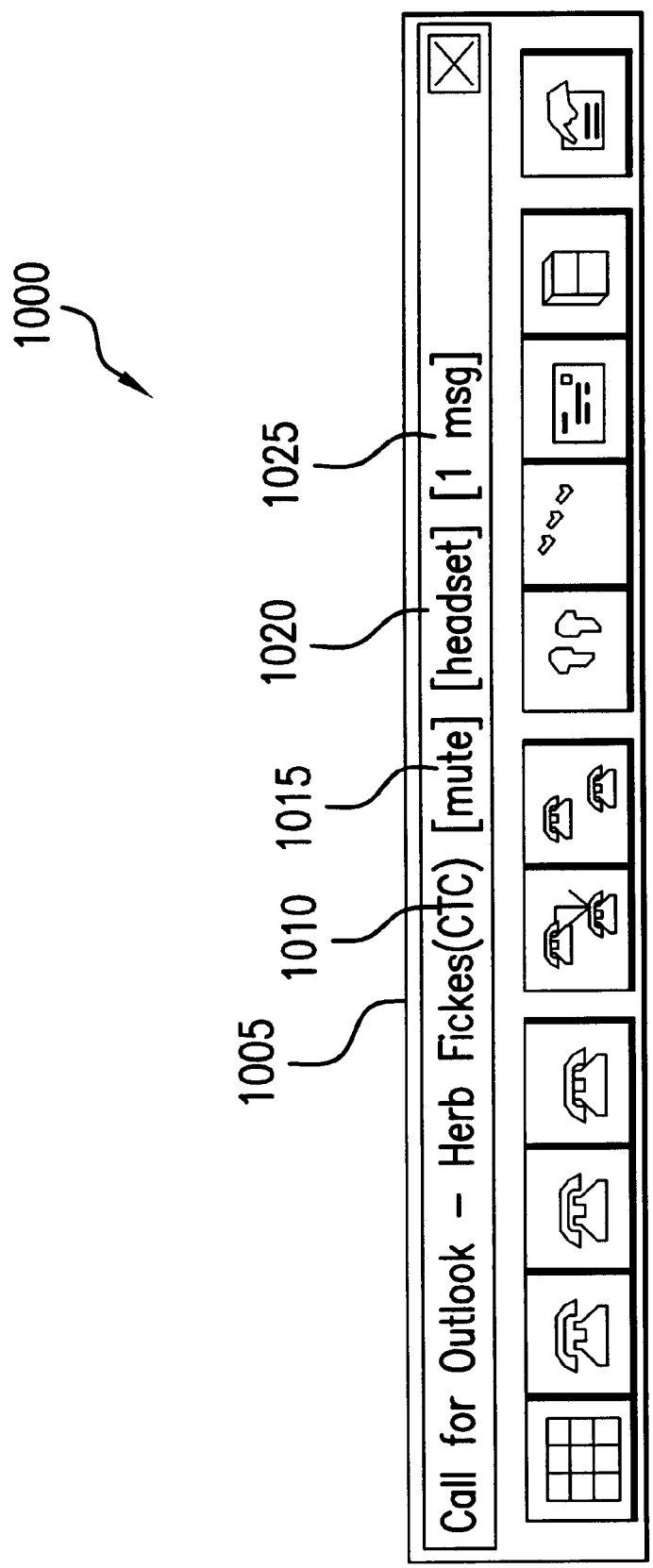
FIG. 10 illustrates an exemplary status display, according to an embodiment of the invention.

In an embodiment of the invention, this information is displayed in the form of a window or a status bar. An example of this is illustrated in FIG. 10. This example shows a status bar 1000 with the user's name 1005, the user's organization 1010, the mute status 1015, the headset status 1020, and an indication 1025 of the number of messages in the user's voice mail. In other situations, various other data is displayed as well, such as the identity of a caller (if known), or information regarding an ongoing teleconference.

E. Option Display

Figure 11:
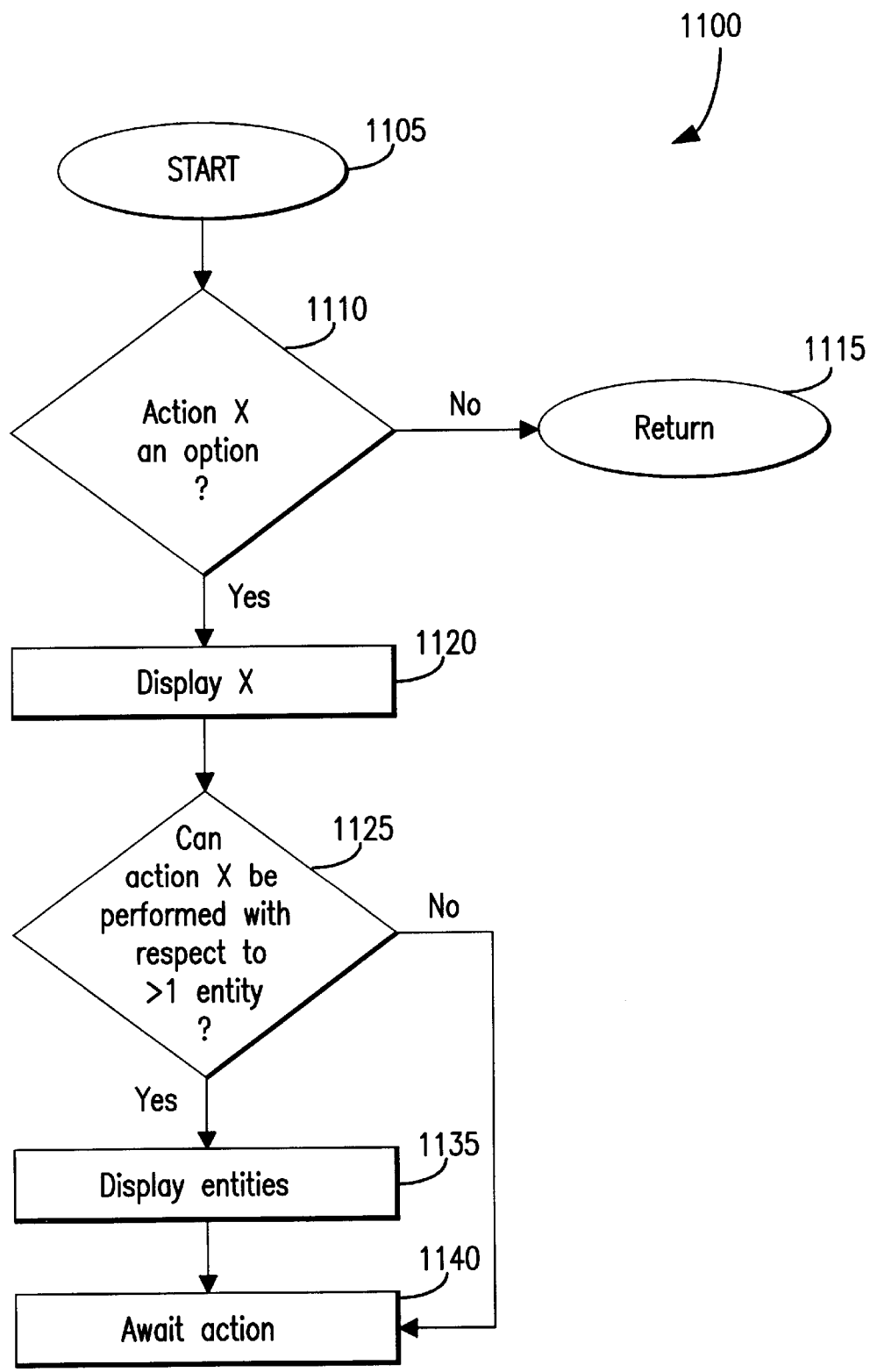
FIG. 11 is a flowchart illustrating the process of presenting control options to a user, according to an embodiment of the invention.

FIG. 11 illustrates a process 1100 whereby configuration and control options are presented to user 135 such that only those options available to user 135 are displayed. The process begins with a step 1105. In a step 1110, a determination is made by option display module 430 as to whether a given action, identified generically in process 1100 as action X, is available to the user as an option. If not, then process 1100 ends with a step 1115. If action X is available, then in a step 1120, action X is displayed by option display module 430 as an option to user 135 via user interface 325. In a step 1125, option display module 430 determines whether action X can be performed with respect to more than one entity. If not, then a user action is awaited in a step 1140. If, however, action X can be performed with respect to more than one entity, then in a step 1135, the entities are displayed by option display module 430 to user 135 via user interface 325. In step 1140, the process awaits a selection by user 135. The appropriate display relies on status information 315 provided by PBX 140 regarding available options.

An example of this is the process of releasing a call from hold status. In this process, if there are no calls on hold, then the option of releasing a call will not be offered to the user. The option of performing the action is offered only if there are one or more calls on hold. If there are two or more calls on hold, i.e., if the action can be performed with respect to one of several entities, then the user will be presented with the choice of which call to release. If, however, there is only one call on hold, user 135 will not be asked to choose which call to release. User 135 will only be asked to whether the call presently on hold is to be released.

Figure 12:
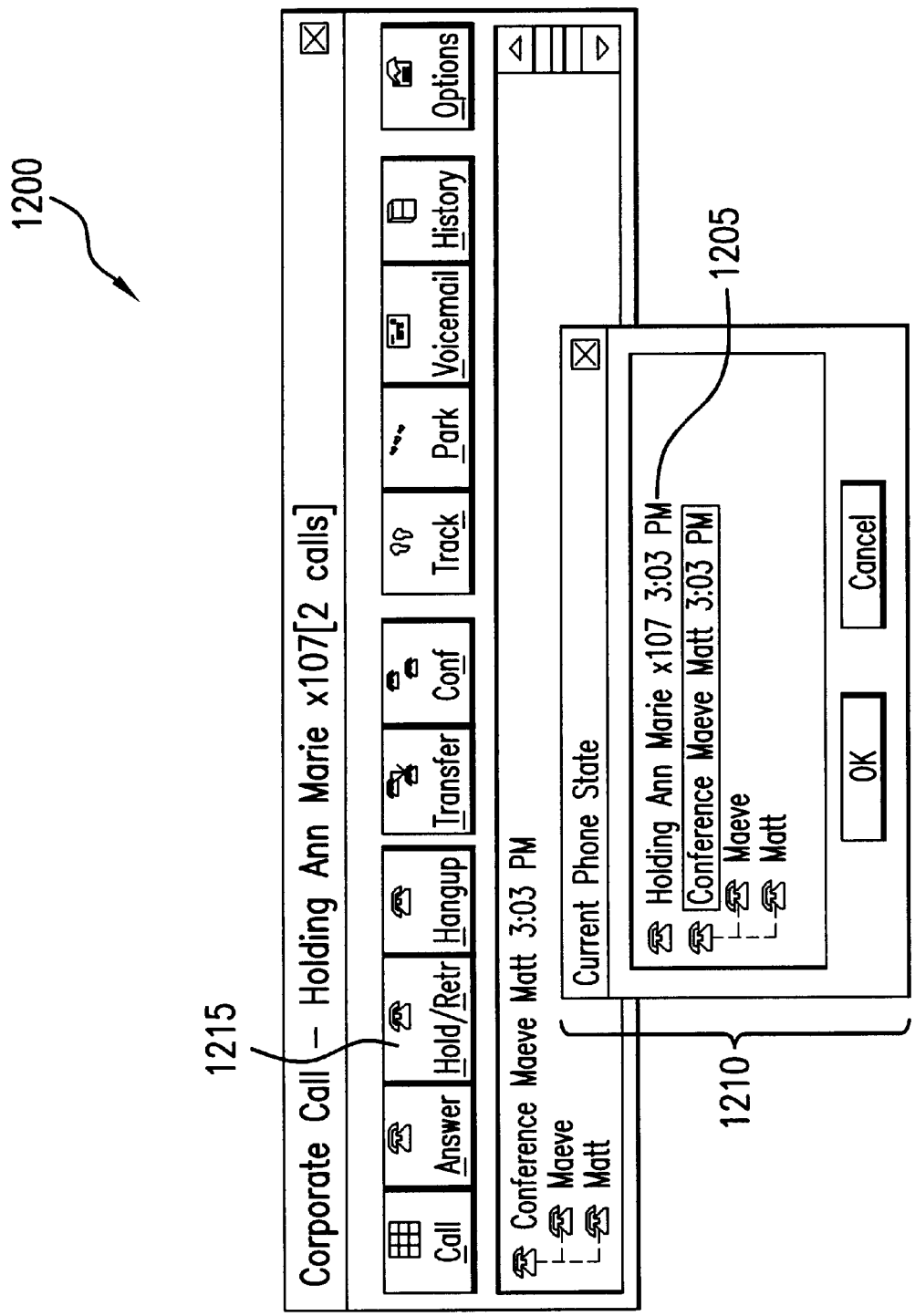
FIG. 12 illustrates an exemplary display of control options, according to an embodiment of the invention.

This is illustrated in display 1200 of FIG. 12. Here, one call 1205 is on hold, as indicated in a current phone status window 1210. Given that only one call is on hold, the user is presented with the option of retrieving the call 1205 using GUI button 1215. The user, however, is not asked to identify a particular call to be retrieved.

Likewise with regard to call transfers, if there is only one call pending, user 135 will not be asked which call is to be transferred. With respect to dialing options such as speed dialing, user 135 will not be asked to select a telephone number unless there are two or more available numbers.

F. Placing Calls Through a Call History

Figure 13:
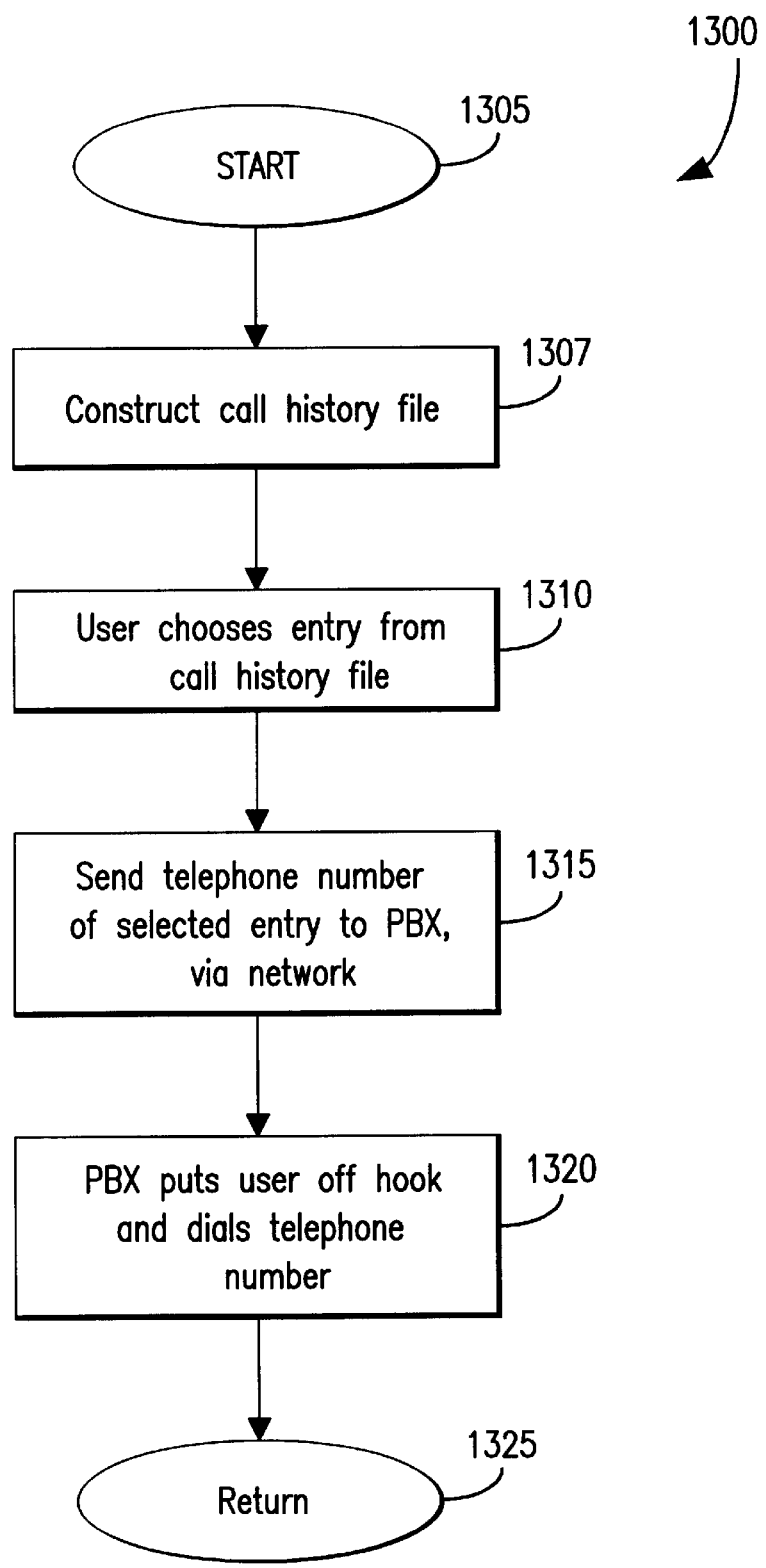
FIG. 13 is a flowchart illustrating the process of placing a call by selecting an entry in a call history file, according to an embodiment of the invention.
Figure 14:
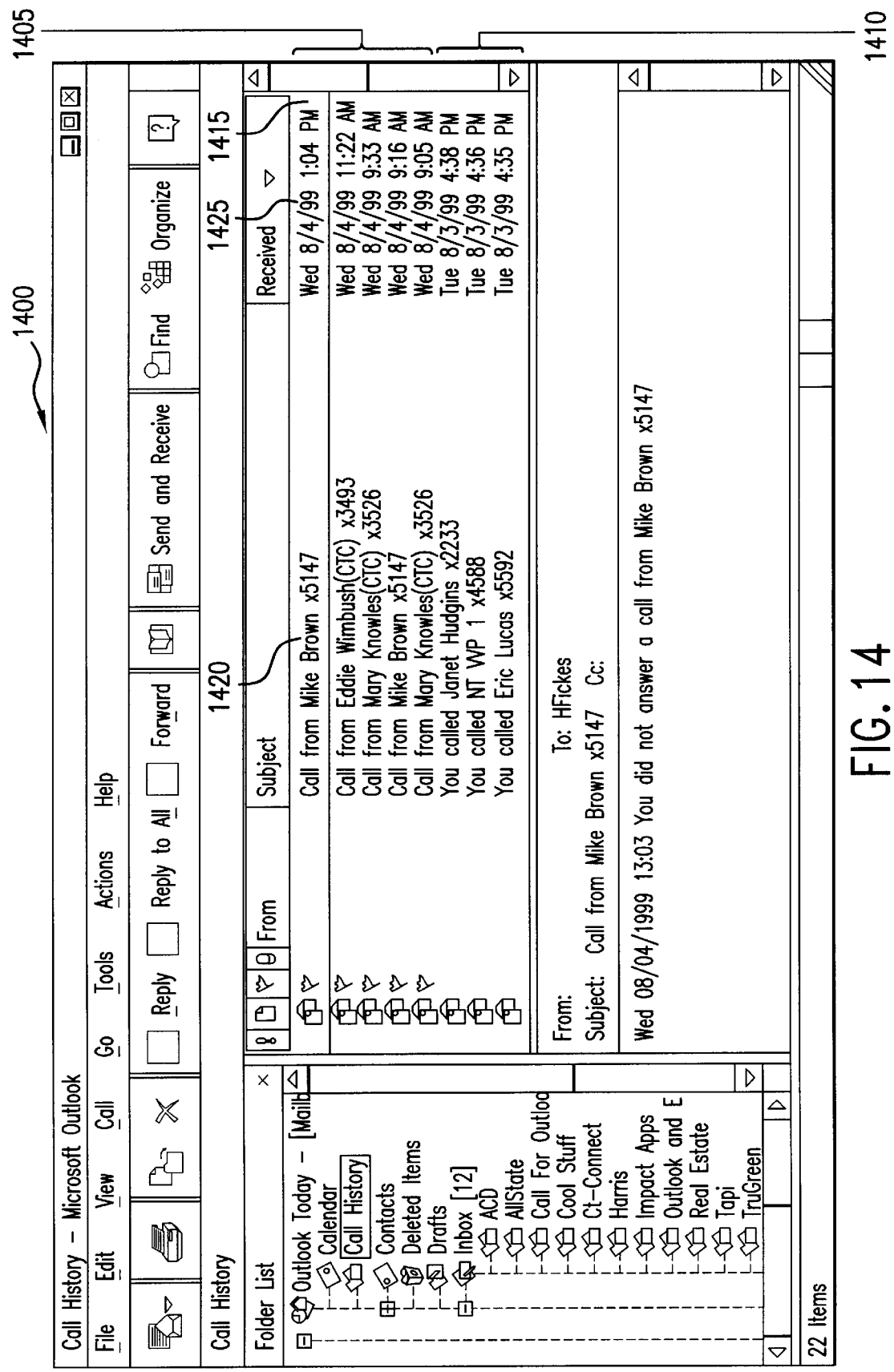
FIG. 14 illustrates an exemplary call history file as displayed to a user, according to an embodiment of the invention.

The process of selecting a number for dialing from the call history 130 is presented in FIGS. 13 and 14. The process begins with a step 1305. In a step 1307, the call history 130 is constructed by call history maintenance module 505. The call history 130 includes an entry for every call received and every call made since some predetermined point in time. Each entry includes the telephone number of the other party. For outgoing calls, the dialed number is provided to call history maintenance module 505 by PBX 140. Likewise, for incoming calls, the number of the calling party is determined by PBX 140 if possible (e.g., if CALLERID is enabled) and passed to call history maintenance module 505. The call history maintenance module 505 can also add other information to an entry if such information is available. If, for example, the identity of the other party can be determined by consulting contact list 115, the party's name will be added to the entry.

In a step 1310, the user selects an entry from call history 130 as displayed by number selection module 510. In an embodiment of the invention, this choice is made through a pointing device, such as a mouse, touchpad, keyboard, or voice recognition technology. In a step 1315, number selection module 510 sends the associated telephone number to PBX 140 through network interface 320. In a step 1320, PBX 140 puts the telephone of user 135 off-hook, and dials the telephone number. The process concludes with a step 1325.

FIG. 14 illustrates how a call history file 1400 could appear to a user in an embodiment of the invention. Note that the display lists both received calls 1405 and calls made by the user 1410. The user can call one of the listed parties by highlighting the appropriate entry 1415 with a pointing device. In the call history file shown, names of callers 1420 are shown, along with the respective times of the calls 1425.

G. Additional features

A product which implements the above functionality may include other features as well. Examples of these features are described in this section. Like the features discussed above, the following features permit a user to control the user's telephone system from the user's computer. In some cases, these features also provide access to information maintained by PIM 105 and PIM extension 125.

1. Answer

This feature informs a user that someone is calling the user's telephone 215. PBX 140 conveys this information to the user via network 225 and user interface 325. This feature also allows the user to answer the call by providing a user input to user interface 325. Such an input can consist of clicking on a GUI button presented by user interface 325, for example. The input is routed to PBX 140 via network 225.

2. Call tag

This feature adds a text field to the status information that is associated with a call. A user receiving a call can, for example, describe the caller's organization and the subject of the call in this text field. This information is entered through user interface 325 and maintained in status information 315. This information can be retained in call history 130. It can also be displayed to a second user if, for example, the call is transferred to the second user.

3. Call transfer

This feature allows a first user to transfer a call to a second user. The first user is informed of the incoming call by PBX 140, via user interface 325. The first user then tells instructs PBX 140 (again, via user interface 325) to transfer the call to the second user.

4. Caller identification

When the name and/or CALLERID of a caller are available, this information is routed by PBX 140 to the called user through user interface 325. This information can also be retained in call history 130.

5. Conference calls

This feature allows establishment of a conference call through the exercise of options made available to a user The necessary actions, such as contacting conferees and placing them in hold status while the conference is established, are accomplished by commands issued to PBX 140 through user interface 325. Information on the status of the conference (e.g., the number of conferees) is maintained in status information 315, and presented by status display module 425 through user interface 325.

6. Do not disturb

This feature allows a user to direct callers to voice mail while permitting the user to place calls. The user, through user interface 325, instructs PBX 140 to direct incoming calls to the voice mailbox of the user.

7. Hangup

This allows a user to end a call. The user instructs PBX 140 to disconnect the call by selecting the appropriate option in user interface 325. This results in a disconnection command to PBX 140, sent through network 225.

8. Hold/retrieve

This allows a user to place a call on hold. The user instructs PBX 140 to place the call on hold by selecting the appropriate option in user interface 325. This results in a corresponding command to PBX 140 through network 225. Retrieving a call from hold status is likewise performed with a command to PBX 140.

9. Call parking

This allows a user to place a call in a hold-like status while associating the call with a specific identifier. Use of an identifier facilitates management of the call. This can be conceptualized as "parking" the call in a specific "orbit." The user commands PBX 140, through user interface 325, to park a call in a designated orbit. The status of the call is recorded in status information 315. Retrieval of a parked call is likewise accomplished through a command to PBX 140.

10. Message paging

This feature allows a user at computer 210 to create a text message and send it to a party via the party's pager. The message is sent through network 225 to PBX 140, which forwards the message.

11. Call transfer

This feature allows a first user to transfer a call to a second user. The first user, using interface 325, identifies the second user. This can be accomplished through inspection of status information 315, which shows which parties are busy (i.e., off-hook) and which are not. The first user then sends a command to PBX 140 (via network 225), instructing PBX 140 to transfer the call to the specified second user. A similar process can be used to direct a call to the voice mailbox of the second user.

12. Telephone audio setting

This feature allows a user to view the volume setting for the user's telephone. This information is made available to the user by status display module 425. Adjustments can be made by the user through user interface 325. This results in a command to PBX 140, which makes the requested change in volume.

IV. Environment

Figure 15:
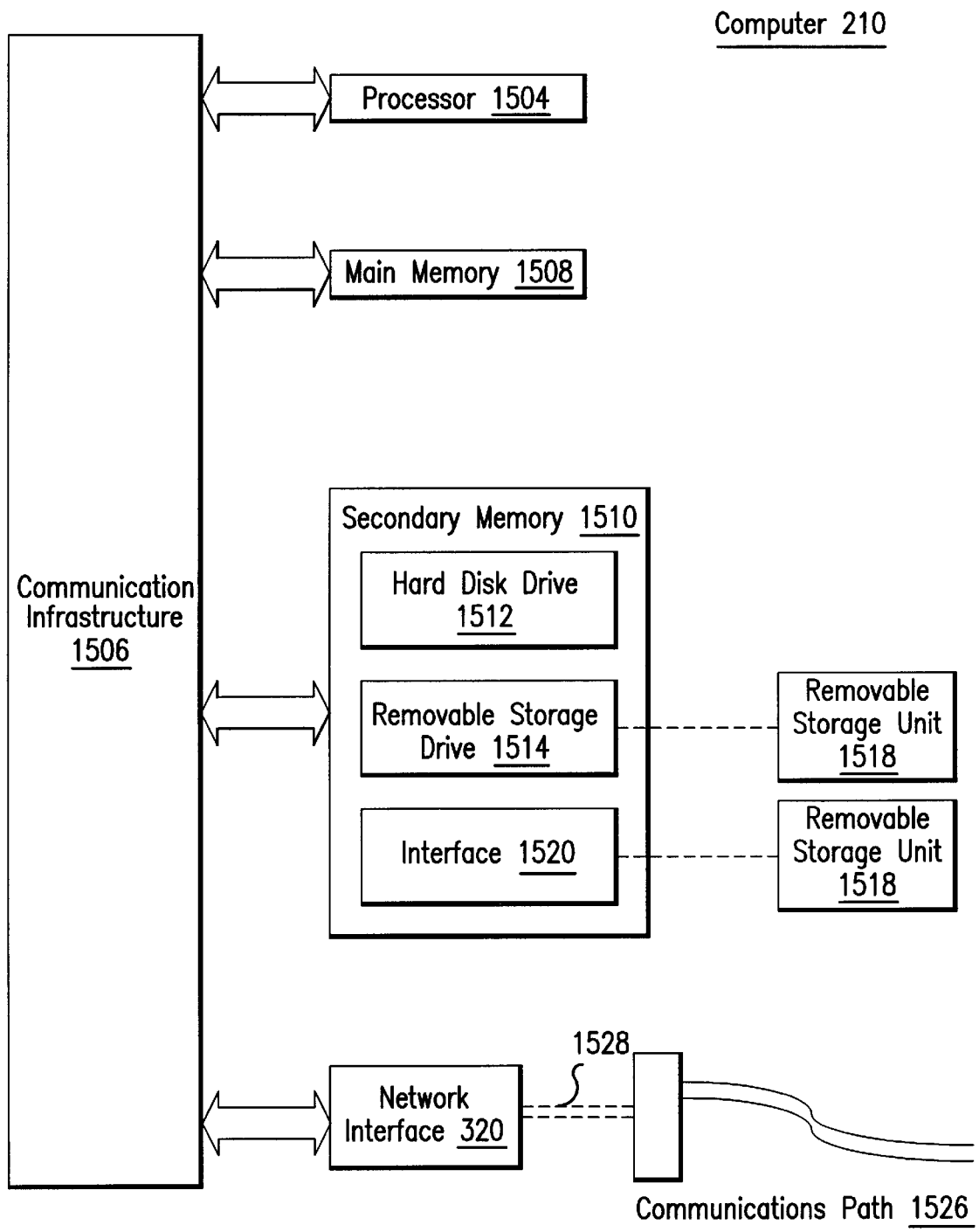
FIG. 15 illustrates an exemplary computing environment of the invention.

In a preferred embodiment of the invention, the PIM extension 125, like the PIM 105, is embodied in software running on a user's computer 210. Computer 210 is shown from a computing hardware perspective in FIG. 15. Computer 210 includes one or more processors, such as processor 1504. Processor 1504 is connected to a communication infrastructure 1506. Various software embodiments are described in terms of this exemplary computer system. After reading this description, it will become apparent to a person skilled in the relevant art how to implement the invention using other computer systems and/or computer architectures.

Computer 210 includes a main memory 1508, preferably random access memory (RAM), and can also include a secondary memory 1510. Secondary memory 1510 can include, for example, a hard disk drive 1512 and/or a removable storage drive 1514, representing a floppy disk drive, a magnetic tape drive, an optical disk drive, etc. Removable storage drive 1514 reads from and/or writes to a removable storage unit 1518 in a well known manner. Removable storage unit 1518 represents a floppy disk, magnetic tape, optical disk, etc., which is read by and written to by removable storage drive 1514. As will be appreciated, removable storage unit 1518 includes a computer usable storage medium having stored therein computer software and/or data. In an embodiment of the invention, the data structures used by PIM extension 125 (such as the calendar 110, e-mail messages 120, contact list 115, and call history 130) are stored in secondary memory 1510.

In alternative embodiments, secondary memory 1510 may include other similar means for allowing computer programs or other instructions to be loaded into computer 210. Such means can include, for example, a removable storage unit 1522 and an interface 1520. More specifically, such means can include a program cartridge and cartridge interface (such as that found in video game devices), a removable memory chip (such as an EPROM, or PROM) and associated socket, and other removable storage units 1522 and interfaces 1520, which allow software and data to be transferred from removable storage unit 1522 to computer 210.

Computer 210 also includes a network interface 320. Network interface 320 allows software and data to be transferred between computer 210 and external systems. Examples of network interface 320 can include a modem, an Ethernet card, or a communications port. Software and data transferred via network interface 320 are in the form of signals which can be electronic, electromagnetic, optical or other signals capable of being received by network interface 320. Channel 1528 carries these signals over communications path 1526, which can be implemented using wire or cable, fiber optics, a phone line, a cellular phone link, an RF link, or other communications media. Communications over communications path 1526 may be structured according to any one of a variety of data protocols, such as the TCP/IP, X.25, or ISO standards. The signals sent over communications path 1526 includes data flowing between computer 210 and PBX 140. This data includes telephone system status information sent from PBX 140 to computer 210 for display to the user 135. This data also includes calendar information sent from computer 210 to PBX 140 for distribution to a caller or to the user's pager. This data also includes unread e-mail messages sent from computer 210 to PBX 140 for distribution to the user's pager, and calling information derived from call history 130 that allows PBX 140 to place a call.

In this document, the terms "computer program medium" and "computer usable medium" are used to generally refer to media such as removable storage device 1518, a hard disk installed in hard disk drive 1512, and signals provided via channel 1528. These computer program products are means for providing software, such as the PIM extension 125 to computer 210.

Computer programs (also called computer control logic) are stored in main memory 1508 and/or secondary memory 1510. Computer programs can also be received via communications interface 1524. Such computer programs, when executed, enable computer 210 to perform features of the present invention as discussed herein. In particular, the computer programs, when executed, enable processor 1504 to perform features of the present invention. Accordingly, such computer programs represent logic of computer 210.

In a preferred embodiment of the present invention, software embodying the PIM extension 125 is stored in a computer program product and loaded into computer 210 using removable storage drive 1514, hard drive 1512 or communications interface 1524. The software, when executed by processor 1504, causes processor 1504 to perform the functions of the invention as described herein.

The PIM extension software normally resides in executable form in secondary memory 1510, e.g., on hard disk drive 1512. When the software is to be executed, the executable code is passed to main memory 1508 via communication infrastructure 1506, and ultimately executed by processor 1504.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of facilitating and enhancing telephone operations using the information and functionality in a personal information manager (PIM), the method comprising the steps of:

(a) providing information contained in one or more data structures of the PIM to users of a telephone system as needed, automatically; and (b) receiving user commands to operate the telephone system through an extension of the PIM graphical user interface (GUI), wherein the PIM executes on a computer that is distinct from any telephone of the telephone system, and wherein step (a) comprises the step of sending unread e-mail to a wireless communications device of an addressee automatically, said unread e-mail sending step comprising the steps of:

(i) identifying an unread e-mail message as eligible for forwarding to the wireless communications device;

(ii) copying the unread e-mail message into a page message when the unread e-mail message has been in an unread e-mail queue of the addressee, unread, for a predetermined time; and (iii) sending the page message to the wireless communications device.

2. The method of claim 1, wherein step (i) comprises the step of identifying an unread e-mail message as eligible for forwarding to the wireless communications device on the basis of the priority of the unread e-mail message.

3. The method of claim 1, wherein step (i) comprises the step of identifying an unread e-mail message as eligible for forwarding to the wireless communications device while identifying all unread e-mail messages as eligible for forwarding.

4. The method of claim 1, wherein step (iii) comprises sending the page message through a computer network to a private branch exchange for transmission to the wireless communications device.

* * * * *